United States Patent
Rajakarunanayake

(10) Patent No.: US 9,935,803 B2
(45) Date of Patent: Apr. 3, 2018

(54) OPPORTUNISTIC PEAK-TO-AVERAGE POWER RATIO REDUCTION IN MU-MIMO WIRELESS COMMUNICATION

(71) Applicant: MediaTek Inc., Hsinchu (TW)

(72) Inventor: Yasantha Rajakarunanayake, San Ramon, CA (US)

(73) Assignee: MEDIATEK INC., Hsin-Chu (TW)

( * ) Notice: Subject to any disclaimer, the term of this patent is extended or adjusted under 35 U.S.C. 154(b) by 119 days.

(21) Appl. No.: 15/170,907

(22) Filed: Jun. 1, 2016

(65) Prior Publication Data

US 2016/0277227 A1   Sep. 22, 2016

Related U.S. Application Data

(60) Provisional application No. 62/188,497, filed on Jul. 3, 2015.

(51) Int. Cl.
| H04L 27/26 | (2006.01) |
| H04B 7/0452 | (2017.01) |
| H04L 5/00 | (2006.01) |
| H04J 13/00 | (2011.01) |
| H04W 84/04 | (2009.01) |

(52) U.S. Cl.
CPC ....... H04L 27/2605 (2013.01); H04B 7/0452 (2013.01); H04J 13/0059 (2013.01); H04L 5/0044 (2013.01); H04L 27/2614 (2013.01); H04W 84/042 (2013.01)

(58) Field of Classification Search
CPC ........... H04L 27/2605; H04L 5/0044; H04L 27/2614; H04J 13/0059; H04B 7/0452; H04W 84/042
See application file for complete search history.

(56) References Cited

U.S. PATENT DOCUMENTS

| 2015/0264161 A1* | 9/2015 | Tian | H04L 69/22 370/338 |
| 2016/0056930 A1* | 2/2016 | Seok | H04L 5/0026 370/330 |
| 2017/0149540 A1* | 5/2017 | Lee | H04L 5/005 |

* cited by examiner

*Primary Examiner* — Thai Nguyen
(74) *Attorney, Agent, or Firm* — Han IP Corporation; Andy M. Han

(57) ABSTRACT

Methods and apparatuses pertaining to opportunistic peak-to-average power ratio reduction in multi-user multi-input and multi-output (MU-MIMO) wireless communication are described. A method may involve determining whether a length of a payload of each spatial stream of a plurality of spatial streams is less than a predetermined length for transmission of each spatial stream of the plurality of spatial streams. The method may also involve padding one or more time slots associated with a first spatial stream of the plurality of spatial streams with one or more special symbols other than zero in response to a determination that the length of a first payload of the first spatial stream is less than the predetermined length. The method may further involve transmitting the first spatial stream which includes the first payload and the one or more special symbols.

13 Claims, 9 Drawing Sheets

OPPORTUNISTIC PEAK-TO-AVERAGE POWER RATIO REDUCTION IN MU-MIMO WIRELESS COMMUNICATION

CROSS REFERENCE TO RELATED PATENT APPLICATIONS

The present disclosure claims the priority benefit of U.S. Patent Application No. 62/188,497, filed on 3 Jul. 2015, which is incorporated by reference in its entirety.

TECHNICAL FIELD

The present disclosure is generally related to wireless communications and, more particularly, to opportunistic peak-to-average power ratio reduction in multi-user multi-input and multi-output (MU-MIMO) wireless communication.

BACKGROUND

Unless otherwise indicated herein, approaches described in this section are not prior art to the claims listed below and are not admitted to be prior art by inclusion in this section. In MU-MIMO wireless communication, multiple antennas simultaneously transmit packets in spatial streams to multiple parties/recipients during a time interval for transmission. The time span of the interval for transmission is usually fixed and determined by the length of the longest packet of the packets being transmitted. One or more of the spatial streams are typically populated in multi-user (MU) groups. However, the payload length of the packets transmitted to some of the recipient groups is sometimes less than the full length available for a given time span.

Conventional approaches supported by the standards (e.g., Long Term Evolution, or LTE, and/or IEEE801.11ac) utilize zero padding at the Media Access Control (MAC) layer. An example scenario 700 is shown in FIG. 7, in which multiple spatial streams are illustrated. In FIG. 7, each spatial stream includes a sequence of time slots (represented by boxes), with spatial stream 1 and spatial stream 3 being transmitted by one antenna and spatial stream 2 being transmitted by two antennas. Specifically, shaded boxes represent time slots with payload data and empty boxes represent time slots with zero padding. In this example, spatial stream 2 has a short payload length. Under the conventional approach of zero padding, padding with bits of 0 and transmission thereof at MAC layer may result in the padded bits being scrambled into a roughly equal number of bits of 0 and bits of 1. Moreover, not transmitting symbols in PHY can mess up channel estimation or create DC offsets. Besides, transmission of padded data typically consumes the same amount of energy as transmission of normal data of a payload even though there is no information content associated with zero padding. Thus, from the perspective of power consumption, padded or scrambled data is indistinguishable from real data.

In transmitting spatial streams, a transmitter usually experiences peaks of increased power as fast Fourier transform (FFT) is uniform while inverse FFT (IFFT) is quite non-uniform. This tends to cause non-linearity in the power amplifier(s) of the transmitter with a resulting peak-to-average power ratio (PAPR) of 8~10 dB for example. Accordingly, signal transmission and reception may be compromised due to PAPR. Therefore, it is desirable to reduce PAPR to enhance system performance. FIG. 8 shows a 64-tone/sample orthogonal frequency-division multiplexing (OFDM) time domain waveform and power magnitude variations in an example simulation result 800 under a conventional approach. In the example shown in FIG. 8, the magnitude of power varies significantly and this leads to PAPR issue. For large number of tones (e.g., 80 MHz), it is common to have a 10-dB PAPR in the IFFT.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to reduce PAPR in a MU-MIMO communication system by utilizing the extra degree of flexibility not specified by the standards in selecting bits/symbols to transmit when there is no payload to transmit for certain time slots in a given time span. For instance, one or more time slots may be padded with special symbol(s) to identify the end of a valid payload, and joint MAC/physical (PHY) layer signaling may be used at the end of payload per MU group. Advantageously, this may result in reduced energy in transmission or reduced PAPR on the transmitter side, thereby achieving enhanced system performance.

In one aspect, a method may involve determining whether a length of a payload of each spatial stream of a plurality of spatial streams is less than a predetermined length for transmission of each spatial stream of the plurality of spatial streams. The method may also involve padding one or more time slots associated with a first spatial stream of the plurality of spatial streams with one or more special symbols other than zero in response to a determination that the length of a first payload of the first spatial stream is less than the predetermined length. The method may further involve transmitting the first spatial stream which includes the first payload and the one or more special symbols.

In another aspect, a method may involve selecting a first antenna of a plurality of antennas for transmission of a padding stream. The method may also involve padding the padding stream with one or more special symbols other than zero. The method may further involve transmitting payloads through one or more other antennas of the plurality of antennas and transmitting the padding stream through the first antenna.

In yet another aspect, an apparatus may include a plurality of antennas, a transmitter and a processor. The transmitter may be operatively coupled to the plurality of antennas and configured to transmit a plurality of spatial streams through the plurality of antennas. The processor may be operatively coupled to the transmitter and configured to perform a number operations. For instance, the processor may determine whether a length of a payload of each spatial stream of the plurality of spatial streams is less than a predetermined length for transmission of each spatial stream of the plurality of spatial streams. The processor may also pad one or more time slots associated with a first spatial stream of the plurality of spatial streams with one or more special symbols other than zero in response to a determination that the length of a first payload of the first spatial stream is less than the predetermined length. The processor may cause the transmitter to transmit the first spatial stream which includes the first payload and the one or more special symbols.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1A:
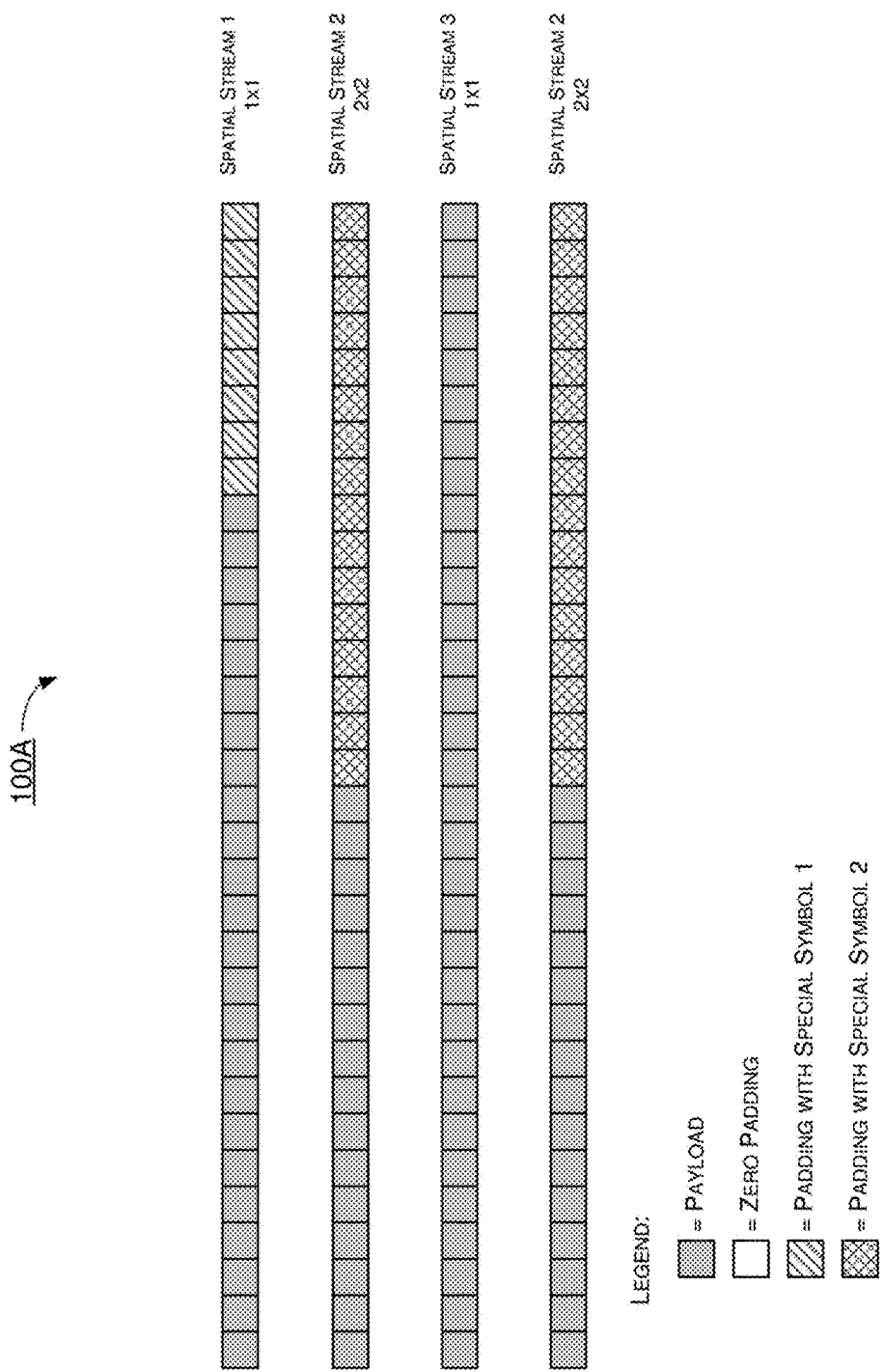
FIG. 1A and FIG. 1B are each a diagram of an example scenario in accordance with the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

In various implementations in accordance with the present disclosure, spatial streams with a short payload may have a termination field which may include, for example, one or more binary or non-binary special OFDM symbols. This terminal field may have excellent auto-correlation properties and may be utilized to identify spatial streams. The termination field may allow a MU-MIMO receiver to discern the end of a packet at the PHY layer. Accordingly, the receiver may switch to a low-power or sleep mode earlier and thereby reduce power consumption. Without this termination field, a MU-MIMO receiver may not be able to discern the end of a packet at the PHY layer and, as a result, may not know when to terminate and save power.

The present disclosure provides methods, apparatuses and systems for opportunistic reduction of PAPR in multi-user transmissions in MU-MIMO wireless communication such as, for example and not limited to, Wi-Fi MU-MIMO. The extra degree of flexibility offered during padding is utilized by implementations in accordance with the present disclosure. Padding of non-payload time slots with special symbols is performed in accordance with the present disclosure when packets of unequal lengths are transmitted simultaneously to separate recipients, and transmission of special symbols during padding intervals advantageously reduces PAPR.

On the transmitter side, signal linearity can be improved with zero padding and PAPR reduction. Accordingly, a power amplifier of a transmitter may be operated with lower bias, thus reducing overall transmitter power. Moreover, knowing the maximum PAPR associated with the transmission of a given packet allows implementations in accordance with the present disclosure to avoid having power peaks exceeding regulatory limits. Furthermore, as techniques in accordance with the present disclosure may be introduced before the IFFT stage at the transmitter, the orthogonality of the transmitter is not affected and there is little or no impact on spectral mask.

On the receiver side, knowing the maximum PAPR of the received packets allows better settings of gain for automatic gain control (AGC) for an analog-to-digital converter (ADC). Advantageously, this not only benefits the receiver but also improves a link margin. Specifically, with non-payload time slots padded with special symbols in accordance with the present disclosure, the overall PAPR received at the receiver can be reduced.

Moreover, padding with special symbols in accordance with the present disclosure may increase the overall coding gain of the packet, thus making the packet more robust and less susceptible to corruption. For instance, non-payload time slots may be padded with a sequence of an error correction checksum corresponding to a payload.

In some implementations in accordance with the present disclosure, specially designed FFT of constant amplitude zero autocorrelation (CAZAC) waveform sequences may be added to OFDM and mixed in MIMO transmissions. Advantageously, this may reduce the overall PAPR. In some implementations in accordance with the present disclosure, one or more CAZAC sequences may be used at the end of a packet to clearly make the end of the packet. Advantageously, this may help in nanosecond-scale timing.

In some implementations in accordance with the present disclosure, constant-amplitude waveforms or near-constant-amplitude waveforms may be repeated at the digital-to-analog converter (DAC), as opposed to nulling as with conventional approaches. For instance, the constant-amplitude waveforms or near-constant-amplitude waveforms may be fed directly to the DAC. Advantageously, this may reduce the PAPR of the entire MU-MIMO bundle.

In some implementations in accordance with the present disclosure, in scheduling MU-MIMO transmissions through multiple antennas, one of the antennas may be purely used to transmit one or more padding streams. The term "padding stream" herein refers to a spatial stream which contains no payload but padded time slots. Alternatively or additionally, one of the spatial streams to be transmitted may be a padding stream. Advantageously, this may reduce the overall PAPR. For example, in a case of two-by-two transmission where each antenna uses 100 mW of power, three of the four antennas may be used to transmit spatial streams with payload and a power increase of 1.7 dB may result. As another example, when there is no second MIMO spatial stream with shorter packet, a full-length CAZAC stream may be mixed with other spatial streams with payload using a mixing matrix.

Reference now is made in detail to the examples illustrated in the accompanying drawings and discussed below.

Figure 1B:
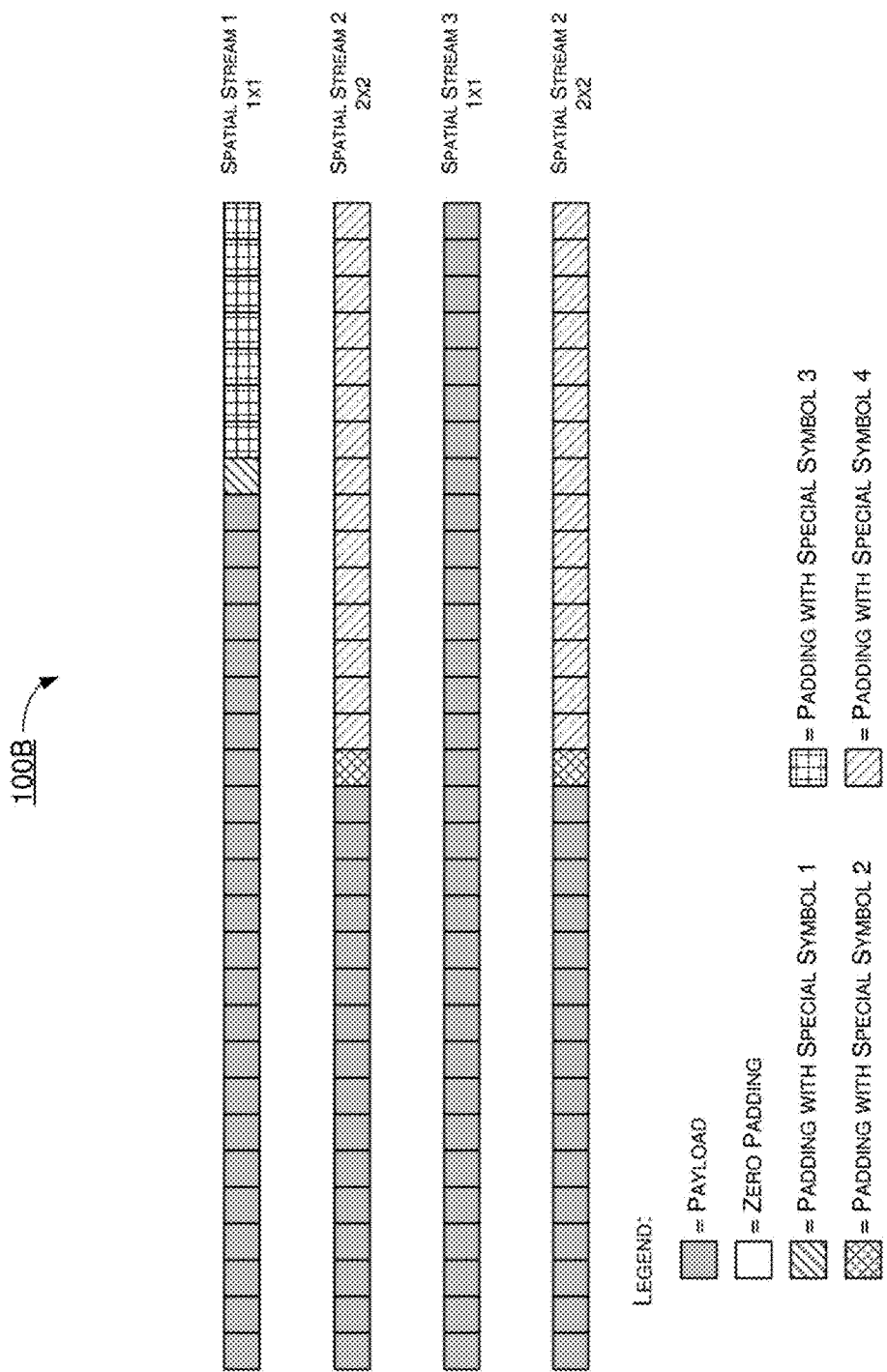

Each of FIG. 1A and FIG. 1B illustrates an example scenario, 100A and 100B, respectively, in accordance with the present disclosure. In each of scenario 100A and scenario 100B, multiple spatial streams to be transmitted in MU-MIMO wireless communication may include a spatial stream 1, a spatial stream 2 and a spatial stream 3. Spatial stream 1 and spatial stream 3 may be transmitted by one antenna at the transmitting (TX) end and received by one antenna at the receiving (RX) end. Spatial stream 2 may be transmitted by two antennas at the TX end and received by two antennas at the RX end. As shown in each of FIG. 1A and FIG. 1B, spatial stream 3 contains a full-length payload and thus requires no padding. On the other hand, each of spatial stream 1 and spatial stream 2 respectively has a shorter payload. Accordingly, one or more time slots associated with each of spatial stream 1 and spatial stream 2 may be padded with one or more special symbols (or non-zero symbols) other than zero in accordance with the present disclosure. In the example shown in each of FIG. 1A and FIG. 1B, the time slot immediately following the payload is padded with a special, or non-zero, symbol in each of spatial stream 1 and spatial stream 2.

According to the present disclosure, each time slot following the payload in a spatial stream may be padded with a special symbol, and when there are multiple time slots following the payload the multiple time slots may be padded with the same special symbol or, alternatively, with two or more different special symbols. According to the present disclosure, each spatial stream may be padded with one or more respective special symbols different from special symbols padded in other spatial streams. In the example shown in FIG. 1A, all the time slots after the payload in spatial stream 1 are padded with a special symbol 1, and all the time slots after the payload in spatial stream 2 are padded with a special symbol 2 which is different from special symbol 1. In the example shown in FIG. 1B, the first time slot immediately after the payload in spatial stream 1 is padded with a special symbol 1 while each of the remaining time slots after the payload in spatial stream 1 are padded with a special symbol 3. Similarly, the first time slot immediately after the payload in spatial stream 2 is padded with a special symbol 2 while each of the remaining time slots after the payload in spatial stream 2 are padded with a special symbol 4, where special symbol 1, special symbol 2, special symbol 3 and special symbol 4 are different from each other. Although not illustrated, in some implementations, each of the time slot may be padded with a different special symbol. The idea is that, according to the present disclosure, each time slot after a payload in a given spatial stream may be padded with a respective special symbol which may or may not be the same as a respective special symbol with which another time slot in the given spatial stream is padded. Advantageously, at the TX end, having the time slot(s) after the payload in each spatial stream padded with special/non-zero symbol(s) may reduce PAPR in transmitting spatial streams padded with special/non-zero symbols. Also advantageously, at the RX end, the receiver may enter a sleep mode to save power upon detecting a special symbol in the time slot immediately following the payload in each received spatial stream.

According to the present disclosure, in padding one or more time slots which would otherwise be zero-padded under the conventional approach, at least one of the one or more time slots may be padded with a sequence of the FFT of a CAZAC waveform. In some implementations, a Zadoff-Chu sequence, which is a type of CAZAC sequences of waveforms, may be used in padding the one or more time slots. Alternatively or additionally, at least one of the one or more time slots may be padded with a sequence of a short training field (STF). Alternatively or additionally, at least one of the one or more time slots may be padded with a sequence of an error correction checksum corresponding to the respective payload of the spatial stream.

For illustrative purpose without limiting the scope of the present disclosure, described below is an example implementation of a CAZAC sequence, namely the Zadoff-Chu sequence. It shall be understood that, although the following example is directed to a particular type of CAZAC sequence, implementations in accordance with the present disclosure may utilize any other type of CAZAC sequence and not limited to the examples herein.

With respect to the Zadoff-Chu sequence, it may be expressed generally by Equation (1) as follows:

$$Z(n) \approx \exp\left(-j\frac{\pi \cdot m \cdot n(n+1)}{N_c}\right) \quad (1)$$

Equation (1) may be utilized for non-binary OFDM. In Equation (1), the complex value at each tone number n of each root Zadoff-Chu sequence is parametrized by m, with $N_c$ being a predetermined prime number. One desirable property of Equation (1) is that the amplitude is constant. By mixing in zero forcing (ZF=FFT(Z)) as the special symbol for padding, the m value may be selected for padding of each spatial stream. That is, by varying the value of m from one m value to another m value, different CAZAC sequences may be generated as different special symbols which may be utilized in padding time slots of the same spatial stream or different spatial streams. Moreover, beamforming matrix may mix in linear combination of the ZF waveform, and this may result in improved or reduced PAPR in time domain for each antenna. For example, for 80 mHz in simulation, the PAPR may be generally limited to 30% of original PAPR, which equates to a 4.7-dB improvement for $90^{th}$ percentile.

As an illustrative example without limiting the scope of the present disclosure, the following is a sample code which may be executed by a processor in accordance with the present disclosure to generate a CAZAC sequence such as a Zadoff-Chu sequence.

```
def get-zvector(n,mm):
    v = zeros(n,dtype="complex")
    nc = 61
    for i * (i+1) * mm * pi/nc
        v[i] = exp(complex(0,1)*u)
    return array(v)
```

When there are multiple time slots to be padded (i.e., when the length of a payload in a spatial stream is less than the full length of the spatial stream), one, some or all of the multiple time slots may be padded with special symbol(s) in accordance with the present disclosure. For instance, all of the multiple time slots may be padded with a particular special symbol (e.g., CAZAC sequence, STF or error correction checksum). Alternatively, one or more time slots of the multiple time slots may be padded with one special symbol while one or more other time slots of the multiple time slots may be padded with a different special symbol. That is, when multiple time slots are padded in accordance with the present disclosure, some or all of the multiple time slots may be padded with different special symbols. Alternatively or additionally, when the payload is shorter than the full length by multiple time slots, one or more, but not all, of the multiple time slots may be padded in accordance with the present disclosure. That is, when the payload is shorter than the full length by multiple time slots, one or more time slots of the multiple time slots may be padded while one or more other time slots of the multiple time slots may be unpadded. For instance, the single one time slot immediately following and adjacent the payload may be padded with a special symbol while the remaining time slots may be left unpadded. In such cases the padded time slot may serve as a termination symbol which may be seen by a recipient as an indication of an end of the payload for the corresponding spatial stream.

Figure 2:
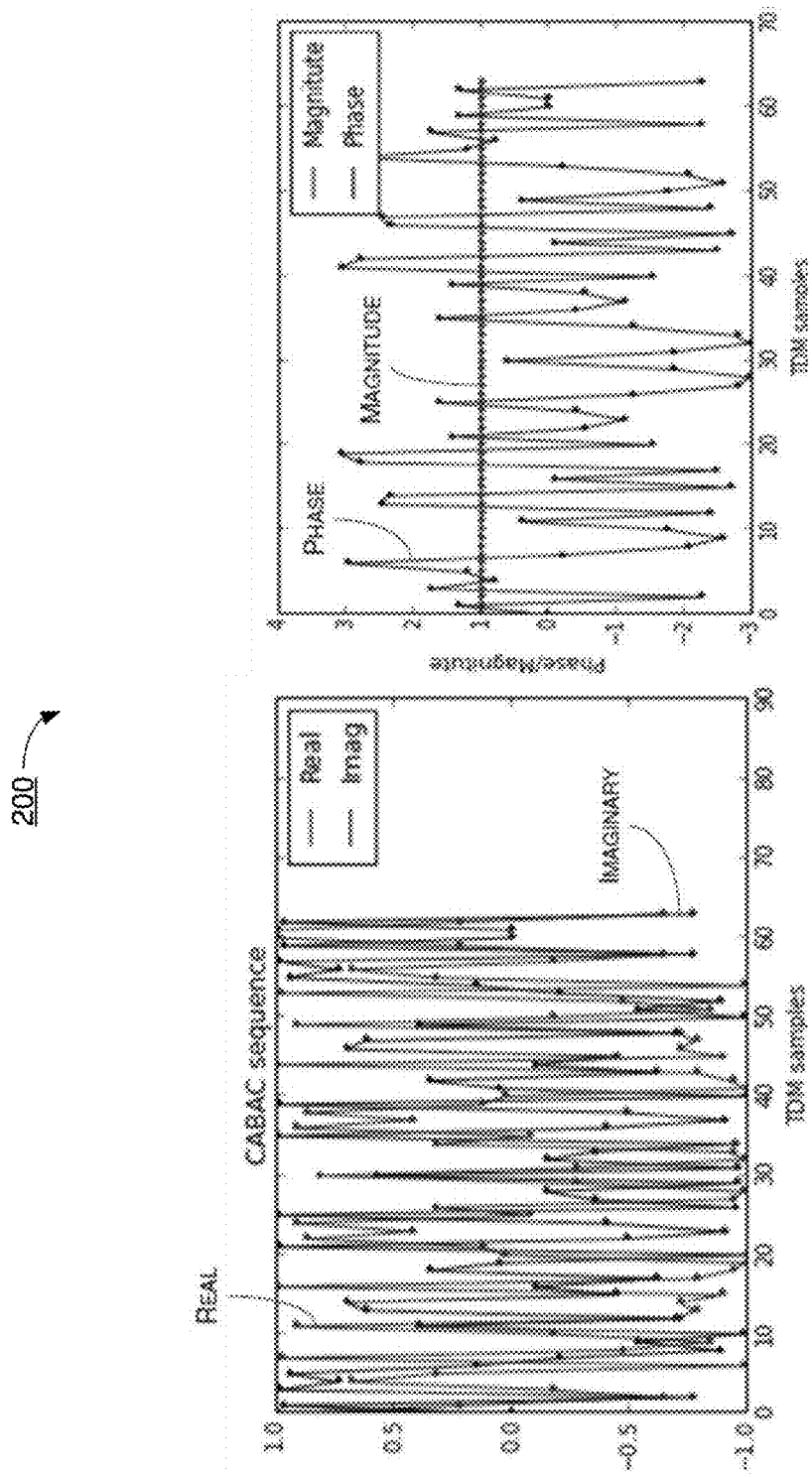
FIG. 2 is a diagram of OFDM time domain waveform and power magnitude variations in an example simulation result in accordance with an implementation of the present disclosure.
Figure 8:
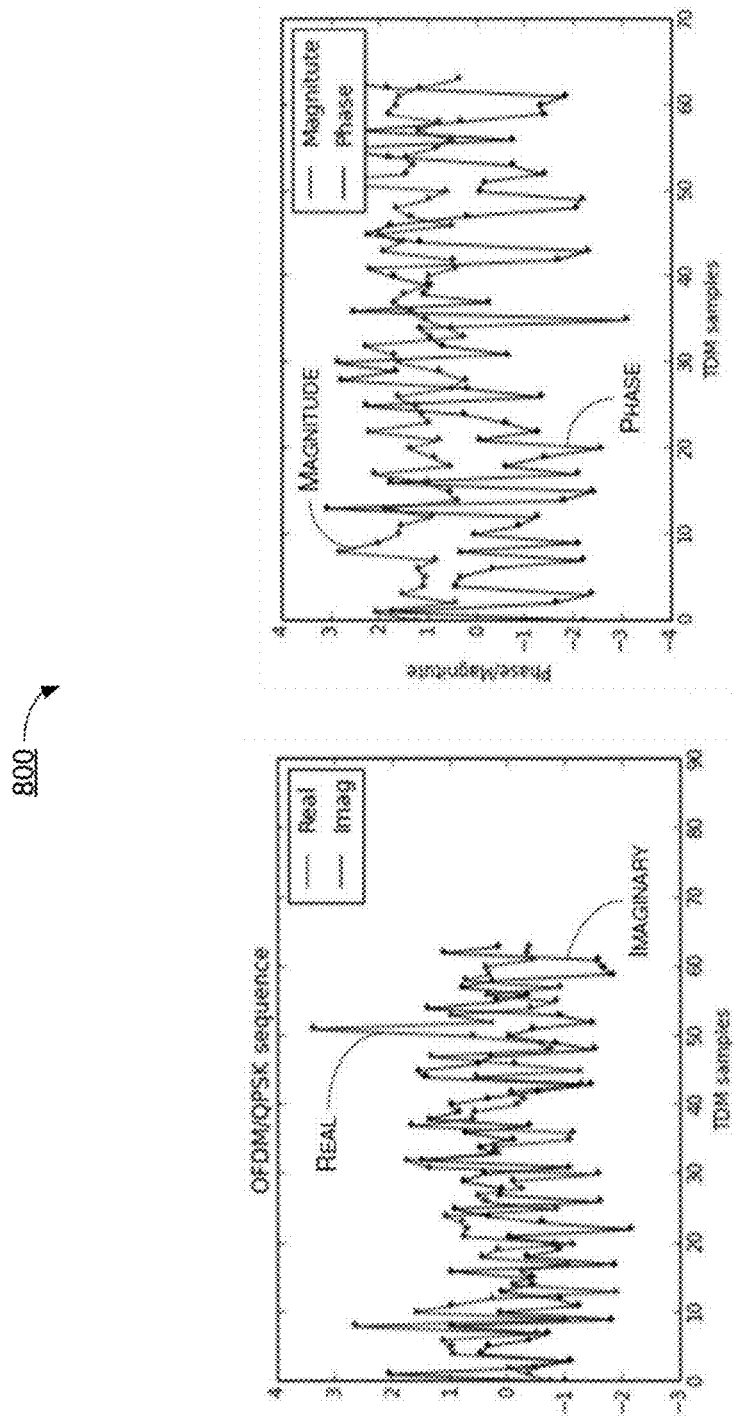
FIG. 8 is a diagram of OFDM time domain waveform and power magnitude variations in an example simulation result under a conventional approach.

FIG. 2 illustrates OFDM time domain waveform and power magnitude variations in an example simulation result 200 in accordance with an implementation of the present disclosure. In simulation result 200, a CAZAC sequence (e.g., Zadoff-Chu sequence) was utilized to show how certain OFDM sequences with very small PAPR may be constructed. The FFT of such waveforms may be added as the padding pattern. As shown in FIG. 2, the magnitude, or amplitude, of power in time-division multiplexing (TDM) is constant and PAPR is 1. Compared to simulation result 800 of FIG. 8, which shows significant variations in the magnitude of power, PAPR can be greatly reduced by padding time slot(s) with special symbol(s) in accordance with the present disclosure.

Thus, in various implementations in accordance with the present disclosure, a waveform having a constant or substantially constant amplitude in time domain may be selected in generating special symbol(s). Several alternatives exist, such as, for example and not limited to, a CAZAC sequence, a STF sequence and an error correction checksum. When the FFT of a CAZAC sequence is used, the time domain waveform upon IFFT can yield constant amplitude. Adding in CAZAC waveforms for padding may be relatively easy. Computationally it is not complex and does not affect the orthogonality of the signal or spectral mask. As for STF, a STF or STF-like sequence may be used in padding and STF is relatively easy to generate by present-day hardware yet desirable PAPR may result as STF is used for energy detection. The TX may benefit greatly with the use SFT sequences for padding.

Illustrative Implementations

Figure 3:
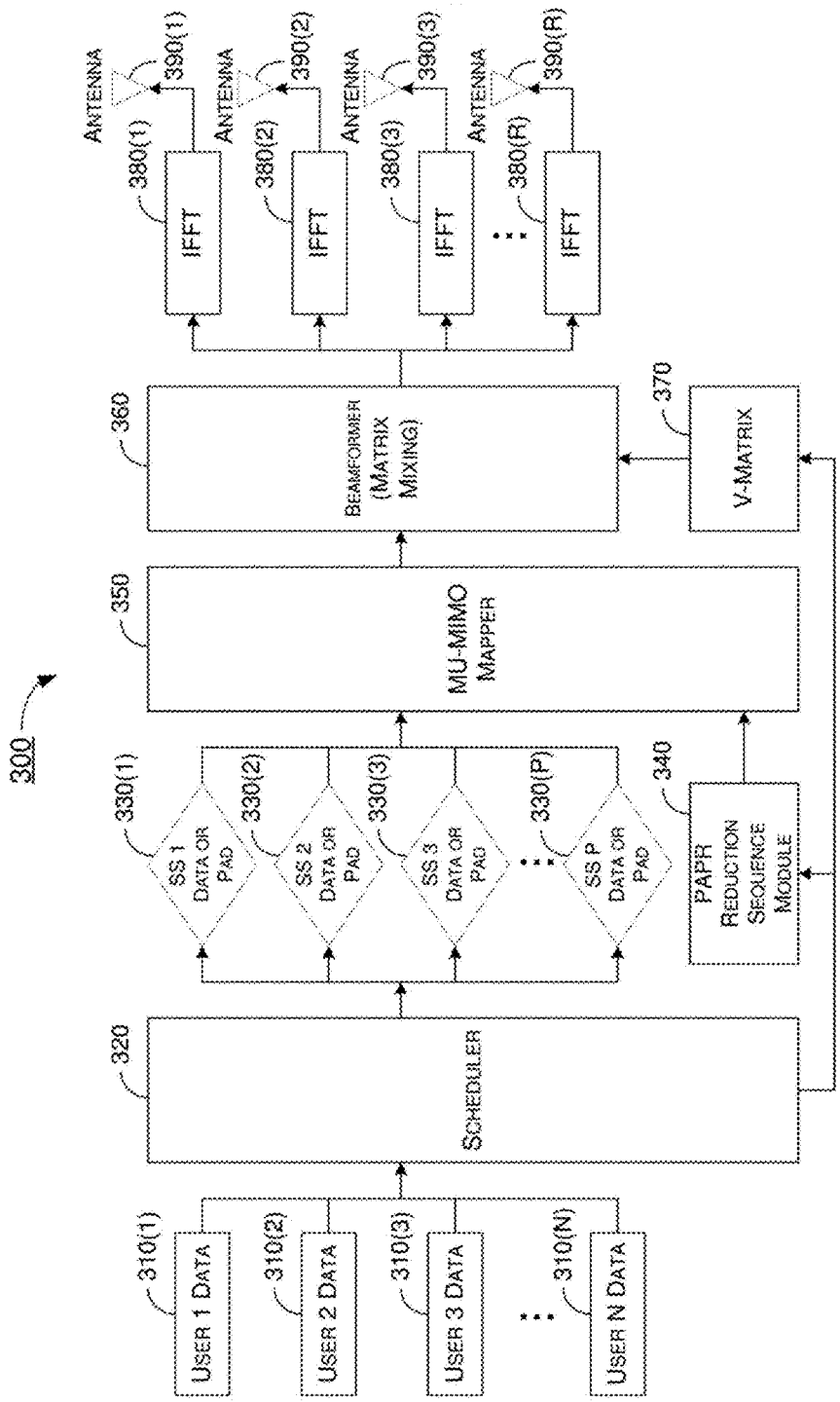
FIG. 3 is a simplified block diagram of an example apparatus in accordance with another implementation of the present disclosure.

FIG. 3 illustrates an example apparatus 300 in accordance with another implementation of the present disclosure. Apparatus 300 may perform various functions to implement techniques, processes and methods described herein pertaining to opportunistic PAPR reduction in MU-MIMO wireless communication, including scenarios 100A/100B and simulation result 200 described above as well as process 500 and process 600 described below. Apparatus 300 may be a part of an electronic apparatus which may be a communication device, a computing apparatus, a portable or mobile apparatus, or a wearable apparatus. For instance, apparatus 300 may be implemented in a Wi-Fi access point, a smartphone, a smartwatch, a smart bracelet, a smart necklace, a personal digital assistant, or a computing device such as a tablet computer, a laptop computer, a notebook computer, a desktop computer, or a server. Alternatively, apparatus 300 may be implemented in the form of a single integrated-circuit (IC) chip or a chipset of multiple IC chips. Apparatus 300 may include at least those components shown in FIG. 3, such as a scheduler 320, a PAPR reduction sequence module 340, a MU-MIMO mapper 350, a beamformer 360, a V-matrix 370, a number of IFFT modules 380(1)~380(R) and a corresponding number of antennas 390(1)~390(R), with R being a positive integer greater than 1. Except for PAPR reduction sequence module 340, the structure and functionality of each of scheduler 320, MU-MIMO mapper 350, beamformer 360, V-matrix 370, IFFT modules 380(1)~380(R) and antennas 390(1)~390(R) may be similar to those of a corresponding component in a conventional MU-MIMO wireless apparatus. Therefore, in the interest of brevity a detailed description thereof is not provided.

PAPR reduction sequence module 340 may be implemented in hardware, firmware, software or a combination thereof. In some implementations, at least a portion of PAPR reduction sequence module 340 may be implemented in hardware including circuitry of electronic components such as, for example and not limited to, one or more transistors, one or more thyristors, one or more memristors, one or more diodes, one or more capacitors, one or more varactors, one or more resistors and/or one or more inductors. Alternatively or additionally, at least a part of PAPR reduction sequence module 340 may be implemented in firmware or software executable by a processor.

In operation, various inputs of user data 310(1)~310(N) are received by scheduler 320, with N being a positive integer greater than 1, and scheduler 320 may schedule and provide multiple OFDM spatial streams 330(1)~330(P), with P being a positive integer greater than 1. Each of the spatial streams 330(1)~330(P) may include payload data, padding, or both payload data and padding, and each of the spatial streams 330(1)~330(P) may undesirably have relatively high PAPR. In accordance with implementations of the present disclosure, PAPR reduction sequence module 340 may output one or more special symbols such as, for example and not limited to, one or more sequences of FFT of a CAZAC waveform, one or more sequences of a STF and/or one or more sequences of one or more error correction checksums corresponding to one or more payloads. The output of PAPR reduction sequence module 340 and the spatial streams 330(1)~330(P) are received by MU-MIMO mapper 350, the output of which is processed through beamformer 360. Advantageously, as the output of PAPR reduction sequence module 340 is mixed into the beamforming matrix of beamformer 360, the resultant PAPR experienced by IFFT modules 380(1)~380(R) may be significantly reduced.

Figure 4:
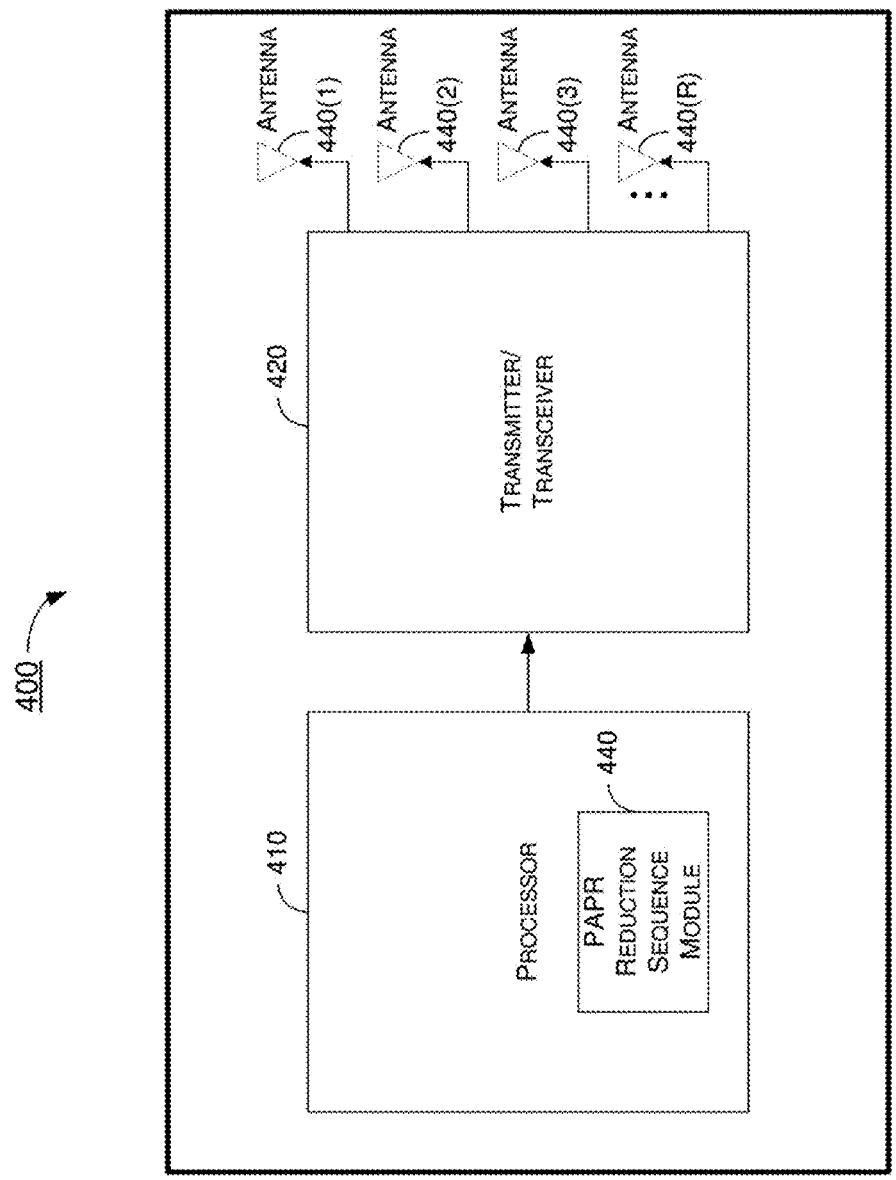
FIG. 4 is a simplified block diagram of an example apparatus in accordance with another implementation of the present disclosure.

FIG. 4 illustrates an example apparatus 400 in accordance with another implementation of the present disclosure. Apparatus 400 may perform various functions to implement techniques, processes and methods described herein pertaining to opportunistic PAPR reduction in MU-MIMO wireless communication, including scenarios 100A/100B and simulation result 200 described above as well as process 500 and process 600 described below. Apparatus 400 may be an electronic apparatus which may be a communication device, a computing apparatus, a portable or mobile apparatus, or a wearable apparatus. For instance, apparatus 400 may be a Wi-Fi access point, a smartphone, a smartwatch, a smart bracelet, a smart necklace, a personal digital assistant, or a computing device such as a tablet computer, a laptop computer, a notebook computer, a desktop computer, or a server. Alternatively, apparatus 400 may be implemented in the form of a single IC chip or a chipset of multiple IC chips. Apparatus 400 may include at least those components shown in FIG. 4, such as a processor 410, a transmitter 420 and a number of antennas 490(1)~490(R), with R being a positive integer greater than 1.

Transmitter 420 may include electronic circuity having components such as, for example and not limited to, a power supply circuit, an electronic oscillator circuit, a modulator circuit, a radio frequency (RF) power amplifier and an impedance matching circuit. Transmitter 420 may be operatively coupled to antennas 490(1)~490(R). Transmitter 420 may be configured to perform operations in accordance with the present disclosure, including transmitting spatial streams with payload as well as padding streams with no payload through antennas 490(1)~490(R) for MU-MIMO wireless communication. In some implementations, transmitter 420 may be a transceiver in that it may also include functionality of a RF receiver.

Processor 410 may be implemented in the form of one or more IC chips, and may include electronic circuitry having one or more components of apparatus 300 including, for example and not limited to, scheduler 320, PAPR reduction sequence module 340, MU-MIMO mapper 350, beamformer 360, V-matrix 370 and IFFT modules 380(1)~380(R). Processor 410 may be operatively coupled to transmitter 420 and cause transmitter 420 to transmit spatial streams with and without padding in accordance with the present disclosure. Processor 410 may include circuitry of electronic components such as, for example and not limited to, one or more transistors, one or more thyristors, one or more memristors, one or more diodes, one or more capacitors, one or more varactors, one or more resistors and/or one or more inductors.

In various implementations in accordance with the present disclosure, processor 410 may perform a number of operations to achieve opportunistic reduction of PAPR in multi-user transmissions in MU-MIMO wireless communication. For instance, processor 410 may determine whether a length of a payload of each spatial stream of multiple spatial streams is less than a predetermined length (e.g., the length of the longest packet) for transmission of each spatial stream of the multiple spatial streams. Processor 410 may also pad one or more time slots associated with a first spatial stream of the multiple spatial streams with one or more special symbols other than zero in response to a determination that the length of a first payload of the first spatial stream is less than the predetermined length. Processor 410 may further cause transmitter 420 to transmit the first spatial stream which includes the first payload and the one or more special symbols.

In some implementations, in padding the one or more time slots associated with the first spatial stream with the one or more special symbols, processor 410 may be configured to pad the one or more time slots associated with the first spatial stream with a sequence of a FFT of a CAZAC waveform, a sequence of a STF, or a sequence of an error correction checksum corresponding to the first payload.

In some implementations, the one or more time slots associated with the first spatial stream may include a plurality of time slots including a first time slot and at least one second time slot. The first time slot may be immediately adjacent an end of the first payload. Accordingly, in padding the one or more time slots associated with the first spatial stream with the one or more special symbols, processor 410 may be configured to pad the first time slot with a termination symbol without padding the at least one second symbol.

In some implementations, in padding the first time slot with the termination symbol, processor 410 may be configured to pad the first time slot with a FFT of a first CAZAC waveform having a first m value, which parametrizes the first CAZAC waveform. In some implementations, processor 410 may be further configured to perform a number of operations. For instance, processor 410 may pad a third time slot immediately adjacent a second payload of a second spatial stream of the multiple spatial streams with a FFT of a second CAZAC waveform having a second m value, which parametrizes the second CAZAC waveform, in response to a determination that the length of the second payload is less than the predetermined length. Processor 410 may also cause transmitter 420 to transmit the second spatial stream which includes the second payload and at least the third time slot. The first m value and the second m value may be different.

In some implementations, processor 410 may be additionally configured to perform operations. For instance, processor 410 may select a first antenna (e.g., antenna 490(1) or another antenna among antennas 490(1)~490(R)) of antennas 490(1)~490(R) for transmission of a padding stream with no payload. Processor 410 may also pad the padding stream with one or more special symbols other than zero. Processor 410 may also cause transmitter 420 to transmit spatial streams containing payloads through one or more other antennas of the plurality of antennas and transmit the padding stream through the first antenna. In some implementations, the one or more special symbols may include a sequence of a FFT of a CAZAC waveform, a sequence of a STF, or a sequence of an error correction checksum corresponding to a respective payload.

Figure 5:
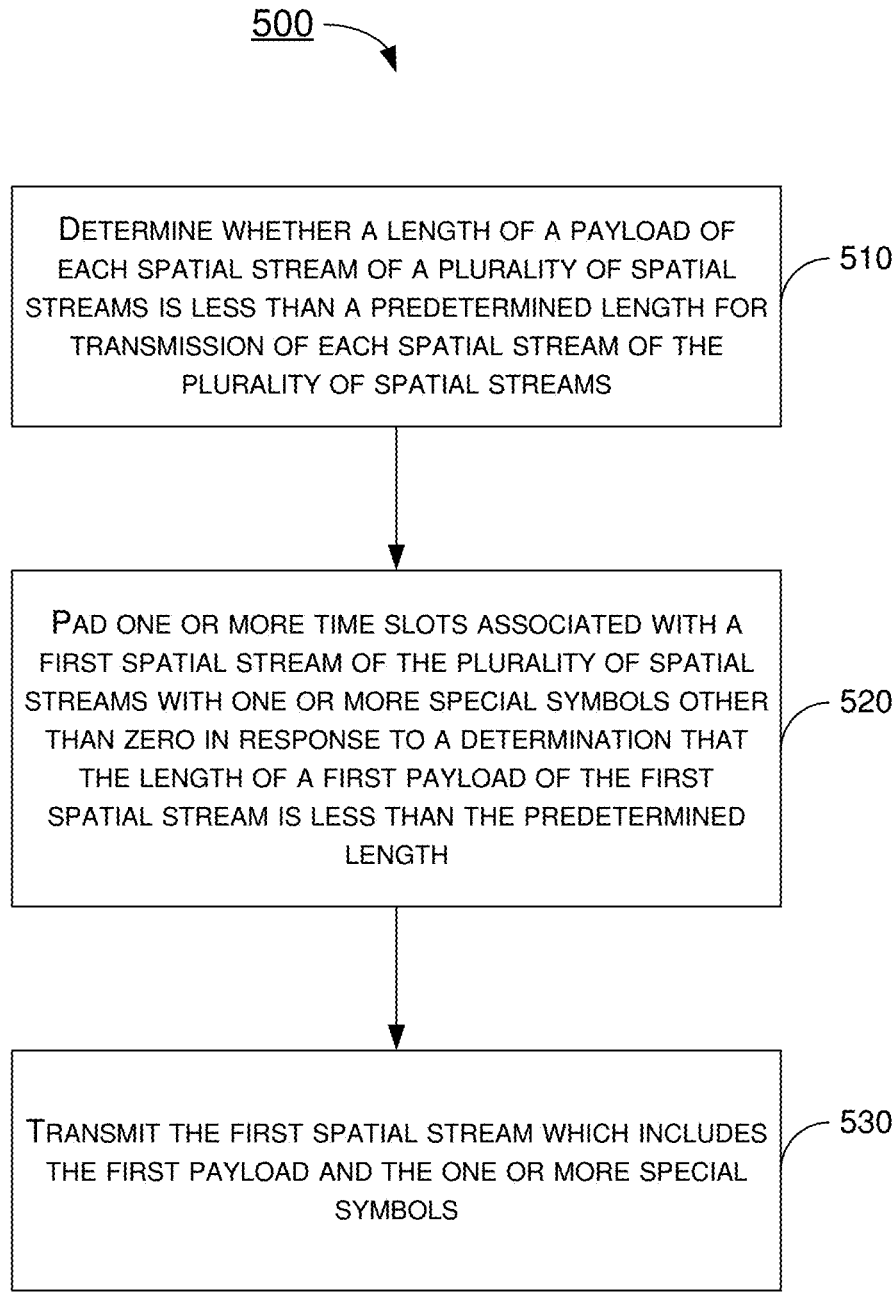
FIG. 5 is a flowchart of an example process in accordance with an implementation of the present disclosure.

FIG. 5 illustrates an example process 500 in accordance with an implementation of the present disclosure. Process 500 may represent an aspect of implementing features of apparatus 300 and apparatus 400. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively in a different order. Process 500 may be implemented by apparatus 300 and apparatus 400. Solely for illustrative purposes, process 500 is described below in the context of apparatus 400. Process 500 may begin at block 510.

At 510, process 500 may involve processor 410 of apparatus 400 determining whether a length of a payload of each spatial stream of multiple spatial streams is less than a predetermined length (e.g., the length of the longest packet) for transmission of each spatial stream of the multiple spatial streams. Process 500 may proceed from 510 to 520.

At 520, process 500 may involve processor 410 of apparatus 400 padding one or more time slots associated with a first spatial stream of the multiple spatial streams with one or more special symbols other than zero in response to a determination that the length of a first payload of the first spatial stream is less than the predetermined length. Process 500 may proceed from 520 to 530.

At 530, process 500 may involve transmitter 420 of apparatus 400 transmitting the first spatial stream which includes the first payload and the one or more special symbols.

In some implementations, in padding the one or more time slots associated with the first spatial stream with the one or more special symbols, process 500 may involve processor 410 of apparatus 400 padding the one or more time slots associated with the first spatial stream with a sequence of a FFT of a CAZAC waveform. Alternatively or additionally, in padding the one or more time slots associated with the first spatial stream with the one or more special symbols, process 500 may involve processor 410 of apparatus 400 padding the one or more time slots associated with the first spatial stream with a sequence of a STF. Alternatively or additionally, in padding the one or more time slots associated with the first spatial stream with the one or more special symbols, process 500 may involve processor 410 of apparatus 400 padding the one or more time slots associated with the first spatial stream with a sequence of an error correction checksum corresponding to the first payload.

In some implementations, the one or more time slots associated with the first spatial stream may include multiple time slots, including a first time slot and at least one second time slot. The first time slot may be immediately adjacent and following an end of the first payload. In padding the one or more time slots associated with the first spatial stream with the one or more special symbols, process 500 may involve processor 410 of apparatus 400 padding the first time slot with a termination symbol without padding the at least one second symbol.

In some implementations, in padding the first time slot with the termination symbol, process 500 may involve processor 410 of apparatus 400 padding the first time slot with a FFT of a first CAZAC waveform having a first m value, which parametrizes the first CAZAC waveform. Additionally, process 500 may also involve processor 410 of apparatus 400 padding a third time slot immediately adjacent a second payload of a second spatial stream of the plurality of spatial streams with a FFT of a second CAZAC waveform having a second m value, which parametrizes the second CAZAC waveform, in response to a determination that the length of the second payload is less than the predetermined length. Moreover, process 500 may further involve transmitter 420 of apparatus 400 transmitting the second spatial stream which includes the second payload and at least the third time slot, where the first m value and the second m value may be different.

In some implementations, in transmitting the first spatial stream, process 500 may involve apparatus 400 transmitting the first spatial stream by transmitter 420, which is a MU-MIMO wireless transmitter.

In some implementations, process 500 may further involve transmitter 420 of apparatus 400 transmitting a second spatial stream, a third spatial stream and a fourth spatial stream of the plurality of spatial streams. Each of three of the first, second, third and fourth spatial streams may include a respective payload. Each of one or more time slots associated with a remaining one of the first, second, third and fourth spatial streams may be padded with a sequence of a FFT of a CAZAC waveform, a sequence of a STF, or a sequence of an error correction checksum corresponding to the payload.

Figure 6:
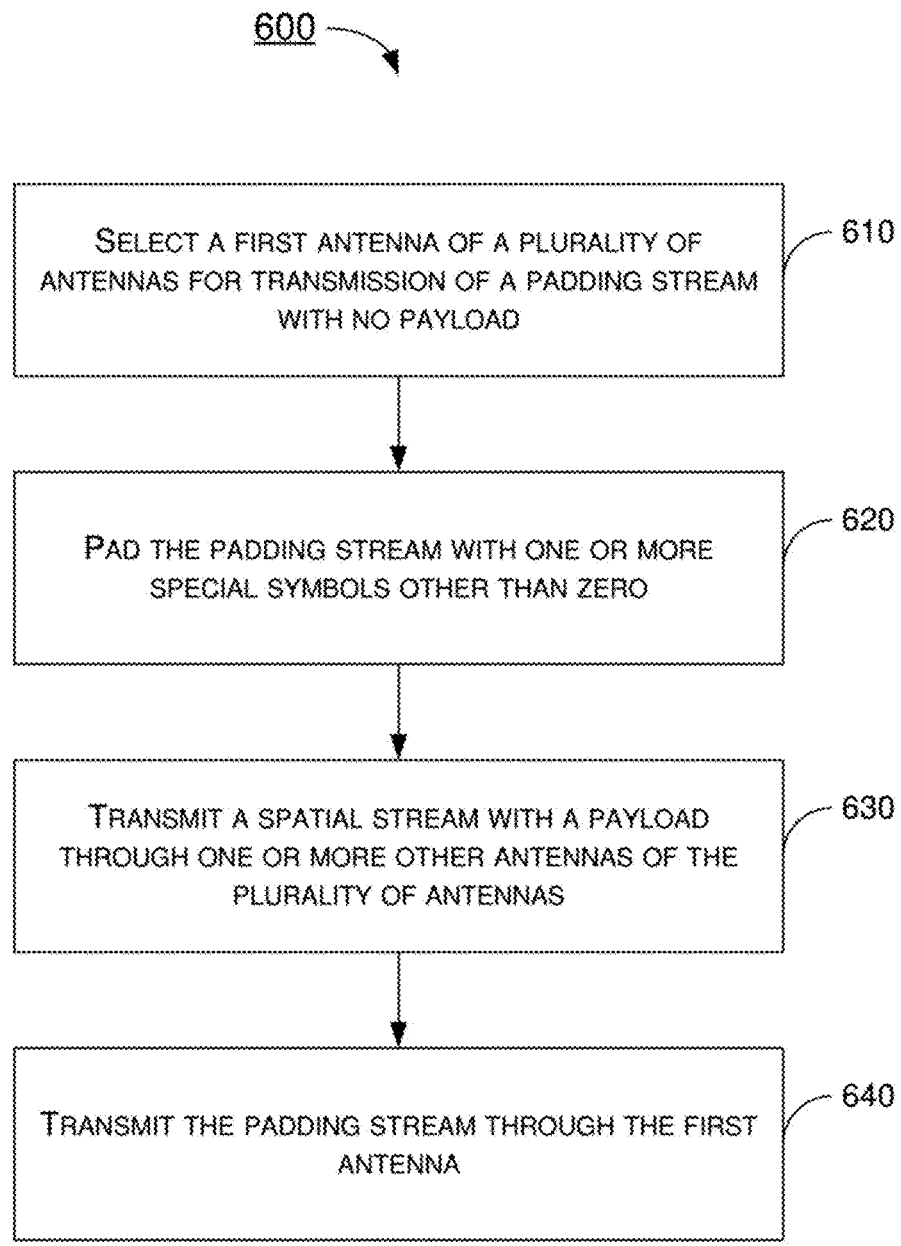
FIG. 6 is a flowchart of an example process in accordance with another implementation of the present disclosure.
Figure 7:
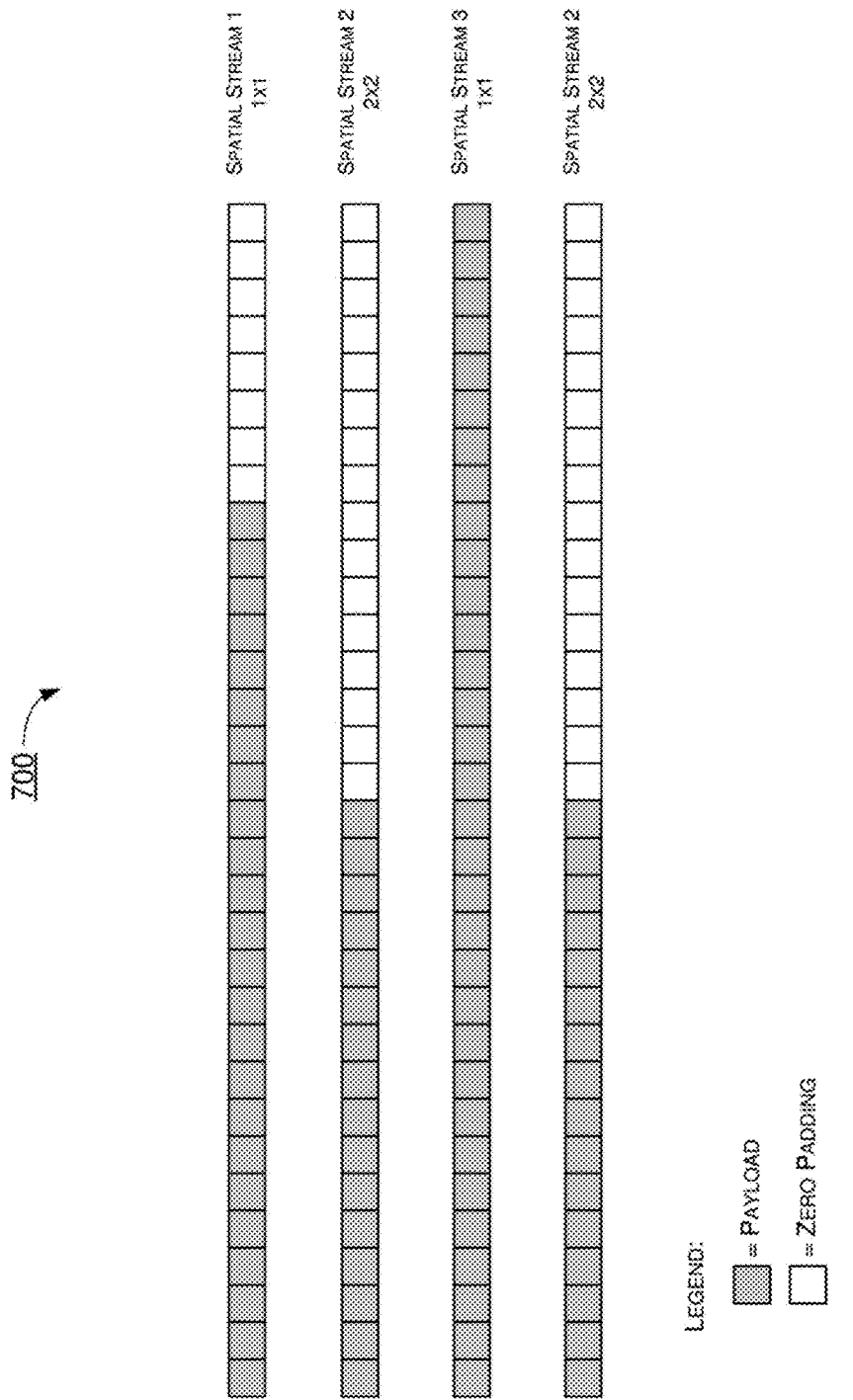
FIG. 7 is a diagram of an example scenario under a conventional approach.

FIG. 6 illustrates an example process 600 in accordance with another implementation of the present disclosure. Process 600 may represent an aspect of implementing features of apparatus 300 and apparatus 400. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively in a different order. Process 600 may be implemented by apparatus 300 and apparatus 400. Solely for illustrative purposes, process 600 is described below in the context of apparatus 400. Process 600 may begin at block 610.

At 610, process 600 may involve processor 410 of apparatus 400 selecting a first antenna of multiple antennas 490(1)~490(R), e.g., antenna 490(1), for transmission of one or more padding streams containing no payload. Process 600 may proceed from 610 to 620.

At 620, process 600 may involve processor 410 of apparatus 400 padding the padding stream with one or more special symbols other than zero. Process 600 may proceed from 620 to 630.

At 630, may involve transmitter 420 of apparatus 400 transmitting a spatial stream with a payload through one or more other antennas of the multiple antennas 490(1)~490(R), e.g., antennas 490(2)~490(R). Process 600 may proceed from 630 to 640.

At 640, process 600 may involve transmitter 420 of apparatus 400 transmitting the padding stream through the first antenna.

In some implementations, the one or more special symbols may include a sequence of a FFT of a CAZAC waveform, a sequence of a STF, or a sequence of an error correction checksum corresponding to the payload.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of wireless transmission in a multi-user multiple-input and multiple-output (MU-MIMO) wireless communication system, comprising:
    determining whether a length of a payload of each spatial stream of a plurality of spatial streams is less than a predetermined length for transmission of each spatial stream of the plurality of spatial streams;
    padding one or more time slots associated with a first spatial stream of the plurality of spatial streams with one or more special symbols other than zero in response to a determination that the length of a first payload of the first spatial stream is less than the predetermined length; and
    transmitting the first spatial stream which includes the first payload and the one or more special symbols,
    wherein the padding of the one or more time slots associated with the first spatial stream with the one or more special symbols comprises one of:
    padding the one or more time slots associated with the first spatial stream with a sequence of a fast Fourier transform (FFT) of a constant amplitude zero autocorrelation (CAZAC) waveform;
    padding the one or more time slots associated with the first spatial stream with a sequence of a short training field (STF); or
    padding the one or more time slots associated with the first spatial stream with a sequence of an error correction checksum corresponding to the first payload.

2. The method of claim 1, wherein the one or more time slots associated with the first spatial stream comprises a plurality of time slots including a first time slot and at least one second time slot, wherein the first time slot is immediately adjacent an end of the first payload, and wherein the padding of the one or more time slots associated with the first spatial stream with the one or more special symbols comprises padding the first time slot with a termination symbol without padding the at least one second symbol.

3. The method of claim 2, wherein the padding of the first time slot with the termination symbol comprises padding the first time slot with a fast Fourier transform (FFT) of a first constant amplitude zero autocorrelation (CAZAC) waveform having a first m value, which parametrizes the first CAZAC waveform.

4. The method of claim 3, further comprising:
    padding a third time slot immediately adjacent a second payload of a second spatial stream of the plurality of spatial streams with a FFT of a second CAZAC waveform having a second m value, which parametrizes the second CAZAC waveform, in response to a determination that the length of the second payload is less than the predetermined length; and
    transmitting the second spatial stream which includes the second payload and at least the third time slot,
    wherein the first m value and the second m value are different.

5. The method of claim 1, wherein the transmitting of the first spatial stream comprises transmitting the first spatial stream by a multi-user multiple-input and multiple-output (MU-MIMO) wireless transmitter.

6. The method of claim 1, further comprising:
    transmitting a second spatial stream, a third spatial stream and a fourth spatial stream of the plurality of spatial streams,
    wherein each of three of the first, second, third and fourth spatial streams includes a respective payload, and
    wherein time slots associated with a remaining one of the first, second, third and fourth spatial streams are padded with a constant amplitude zero autocorrelation (CAZAC) waveform.

7. A method of wireless transmission in a multi-user multiple-input and multiple-output (MU-MIMO) wireless communication system, comprising:
    selecting a first antenna of a plurality of antennas for transmission of a padding stream with no payload;
    padding the padding stream with one or more special symbols other than zero;
    transmitting a spatial stream with a payload through one or more other antennas of the plurality of antennas; and
    transmitting the padding stream through the first antenna,
    wherein the one or more special symbols comprise a sequence of a fast Fourier transform (FFT) of a constant amplitude zero autocorrelation (CAZAC) waveform, a sequence of a short training field (STF), or a sequence of an error correction checksum corresponding to the payload.

8. An apparatus implementable in a multi-user multiple-input and multiple-output (MU-MIMO) wireless communication system, comprising:
a plurality of antennas;
a transmitter operatively coupled to the plurality of antennas and configured to transmit a plurality of spatial streams through the plurality of antennas; and
a processor operatively coupled to the transmitter, the processor configured to perform operations comprising:
determining whether a length of a payload of each spatial stream of the plurality of spatial streams is less than a predetermined length for transmission of each spatial stream of the plurality of spatial streams;
padding one or more time slots associated with a first spatial stream of the plurality of spatial streams with one or more special symbols other than zero in response to a determination that the length of a first payload of the first spatial stream is less than the predetermined length; and
causing the transmitter to transmit the first spatial stream which includes the first payload and the one or more special symbols,
wherein, in padding the one or more time slots associated with the first spatial stream with the one or more special symbols, the processor is configured to perform one of:
padding the one or more time slots associated with the first spatial stream with a sequence of a fast Fourier transform (FFT) of a constant amplitude zero autocorrelation (CAZAC) waveform;
padding the one or more time slots associated with the first spatial stream with a sequence of a short training field (STF); or
padding the one or more time slots associated with the first spatial stream with a sequence of an error correction checksum corresponding to the first payload.

9. The apparatus of claim 8, wherein the one or more time slots associated with the first spatial stream comprises a plurality of time slots including a first time slot and at least one second time slot, wherein the first time slot is immediately adjacent an end of the first payload, and wherein, in padding the one or more time slots associated with the first spatial stream with the one or more special symbols, the processor is configured to pad the first time slot with a termination symbol without padding the at least one second symbol.

10. The apparatus of claim 9, wherein, in padding the first time slot with the termination symbol, the processor is configured to pad the first time slot with a fast Fourier transform (FFT) of a first constant amplitude zero autocorrelation (CAZAC) waveform having a first m value, which parametrizes the first CAZAC waveform.

11. The apparatus of claim 10, wherein the processor is further configured to perform operations comprising:
padding a third time slot immediately adjacent a second payload of a second spatial stream of the plurality of spatial streams with a FFT of a second CAZAC waveform having a second m value, which parametrizes the second CAZAC waveform, in response to a determination that the length of the second payload is less than the predetermined length; and
causing the transmitter to transmit the second spatial stream which includes the second payload and at least the third time slot,
wherein the first m value and the second m value are different.

12. The apparatus of claim 8, wherein the processor is further configured to perform operations comprising:
selecting a first antenna of the plurality of antennas for transmission of a padding stream with no payload;
padding the padding stream with one or more special symbols other than zero;
causing the transmitter to transmit spatial streams containing payloads through one or more other antennas of the plurality of antennas; and
causing the transmitter to transmit the padding stream through the first antenna.

13. The apparatus of claim 12, wherein the one or more special symbols comprise a sequence of a fast Fourier transform (FFT) of a constant amplitude zero autocorrelation (CAZAC) waveform, a sequence of a short training field (STF), or a sequence of an error correction checksum corresponding to a respective payload.

* * * * *